G. GORTON.
CUTTING OFF SAW AND THE LIKE.
APPLICATION FILED MAR. 19, 1912.

1,047,205.

Patented Dec. 17, 1912.
2 SHEETS—SHEET 2.

Witnesses
W. A. Williams
E. R. Peck

Inventor
George Gorton
By
Hubert E. Peck, Attorney

G. GORTON.
CUTTING OFF SAW AND THE LIKE.
APPLICATION FILED MAR. 19, 1912.
1,047,205.
Patented Dec. 17, 1912.
2 SHEETS—SHEET 1.
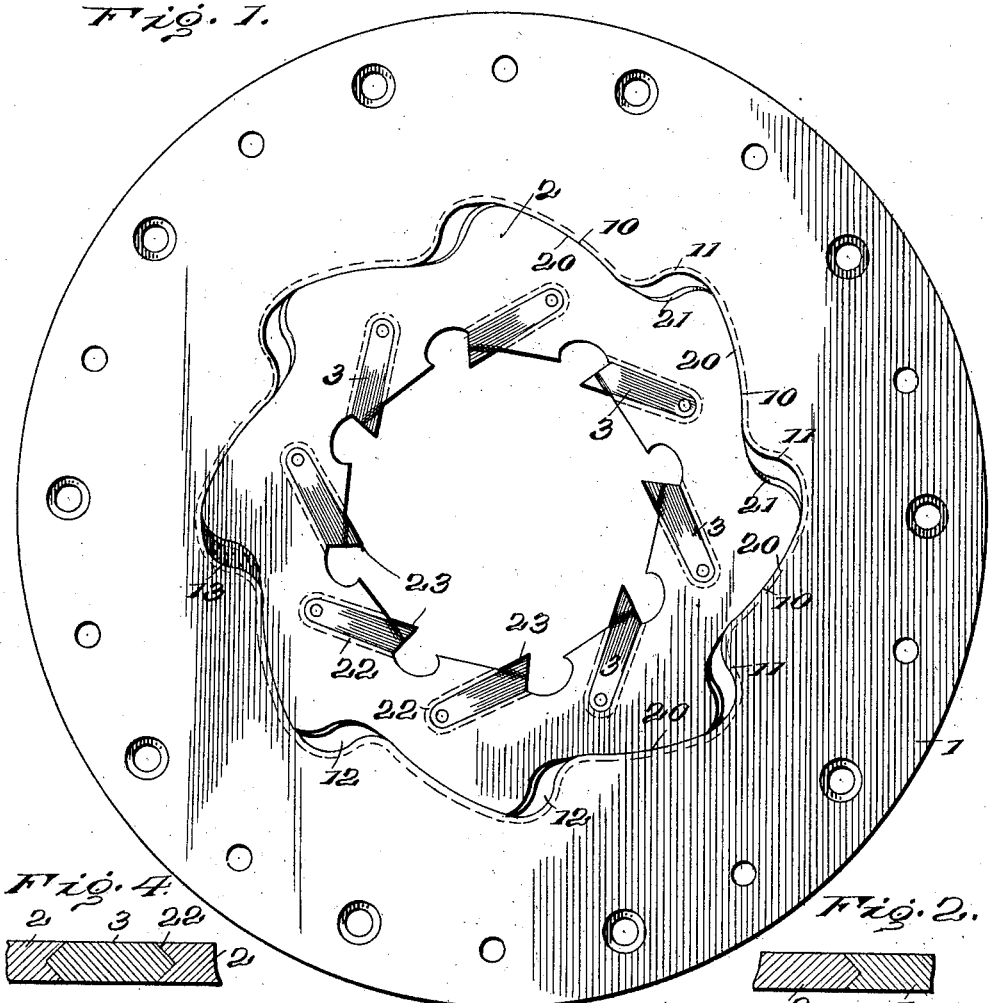
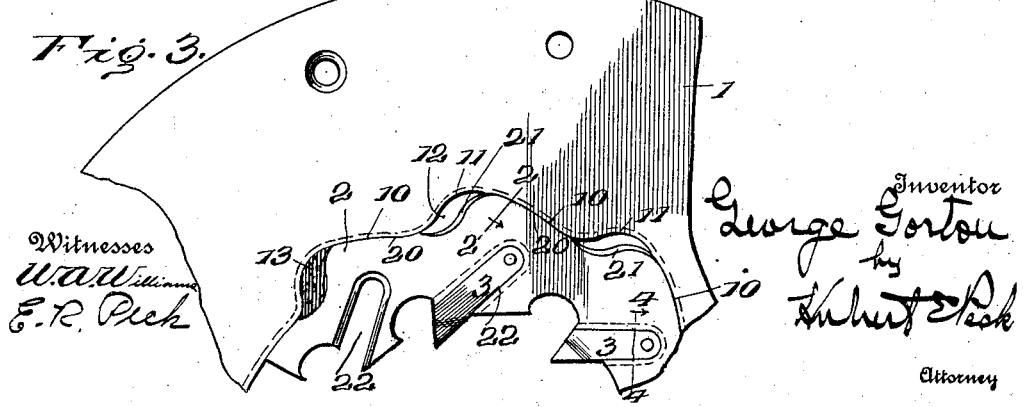

UNITED STATES PATENT OFFICE.

GEORGE GORTON, OF RACINE, WISCONSIN.

CUTTING-OFF SAW AND THE LIKE.

1,047,205.   Specification of Letters Patent.   Patented Dec. 17, 1912.

Application filed March 19, 1912. Serial No. 684,882.

*To all whom it may concern:*

Be it known that I, GEORGE GORTON, a citizen of the United States, residing at Racine, in the county of Racine and State of Wisconsin, have invented certain new and useful Improvements in Cutting-Off Saws and the Like, of which the following is a specification.

This invention relates to certain improvements in cutting-off saws, and the like; and the objects and nature of the invention will be readily understood by those skilled in the art in the light of the following explanation of the accompanying drawing showing what I now believe to be the preferred embodiment from among other formations, constructions and arrangements within the spirit and scope of my invention.

It is an object of the invention to provide a rotary saw blade with a removable cutter ring having pockets receiving insertible cutters usually of so-called high speed or high duty steel or alloy and removably fixed in said pockets, the blade and ring being relatively formed to lock together in such a manner that the blade will sustain the thrust of the cutters when in action, and yet so that the ring with its cutters can be readily removed bodily or as a whole for cutter sharpening or other purposes, without removing the cutters from the ring, whereby a number of such rings having insertible cutters can be kept on hand for use in the one blade permitting a ring with dull cutters to be removed from the blade and another ring with previously sharpened cutters to be quickly inserted and locked therein with a resulting economy in the operation of cutting off machines due to the time saved in removing and replacing cutters.

A further object of the invention is to provide an improved cutting-off saw comprising a blade, disk or holder having a central opening, and a cutter ring or annulus removably fitted and fixed to said blade and around said opening and provided with and carrying insertible cutters removably fixed thereto and removable from and applicable to the blade with the ring, for the production of a saw for economical severing of steel and other bars of moderate diameter cold at moderate speeds and feeds and with the formation of a comparatively narrow kerf.

The invention consists in certain novel features in construction and in combinations and arrangements as more fully and particularly set forth hereinafter.

Figure 5:
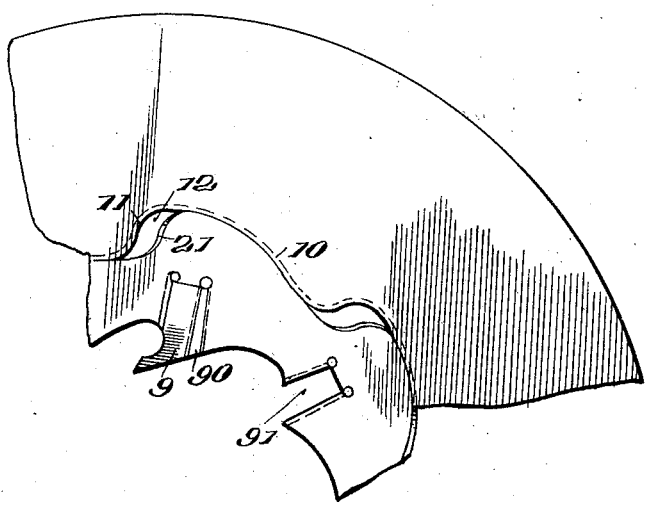
Figure 6:
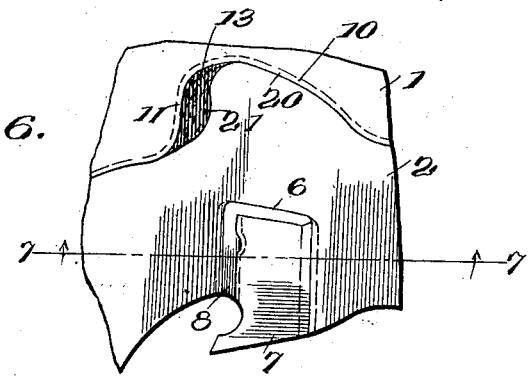
Figure 7:
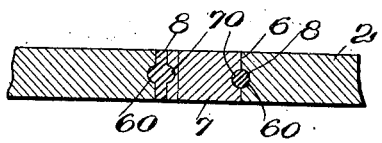

Referring to the accompanying drawings;—Figure 1, is an elevation of a saw constructed in accordance with my invention. Fig. 2, is a detail section on the line 2—2, Fig. 3. Fig. 3, is an elevation of a portion of the structure of Fig. 1, on an enlarged scale. Fig. 4, is a section on the line 4—4, Fig. 3. Figs. 5, 6, and 7, illustrate other forms of the invention.

In the structure of Fig. 1, I show a saw blade or disk 1, adapted to be secured around its outer edge portion to any suitable rotary driving drum or holder. This blade is formed with a central work receiving opening, and in the particular example illustrated, the edge of the blade around said opening is formed of an annular series of similar uniformly-spaced inclined circumferentially arranged abutments or wedging edge portions or surfaces 10, and intervening abrupt shoulders 11, between or connecting the high and low ends of the abutments or wedging edge portions. The cutting elements are carried by a flat cutter-ring or annulus 2, formed to fit within the central opening of the blade and to be removably locked in driving thrust sustaining and distributing relation thereto.

In the particular examples illustrated, the outer surrounding edge of this ring is formed by an annular series of similar uniformly-spaced circumferentially-arranged inclined abutments or wedging edge portions or surfaces 20, and intervening shoulders or portions 21, between and connecting the high and low ends of said inclines 20. The inclines 20, correspond to the inclines or aforementioned surfaces 10, of the blade and are formed to longitudinally fit the same. The outer surrounding edge of the ring is formed to interlock with the inner surrounding edge of the blade against lateral deflection or displacement when the ring is in locked position in the blade. This result is usually accomplished by longitudinally and centrally grooving one edge and beveling the side faces of the opposite edge to form a corresponding projection to enter such groove, say about as shown in the drawings, although I do not wish to so limit my invention. The said corresponding edges of the ring and blade, in the examples shown, are so formed that the ring can be slipped laterally into the central opening of the blade and into the plane of the blade and can then be locked thereto by a rotary or axial movement of the ring within the blade, in a direction opposite to the direction of rotation of the saw, to bring the inclines 20, of the ring into longitudinal wedging engagement with the inclined surfaces 10, of the blade. These wedging abutting inclines are preferably so arranged as to sustain the thrust of the cutters in action and relieve the ring of undue strain by transmitting the same to the blade, yet without so tightly wedging the ring in the blade as to cause buckling or collapse of the ring or causing the ring to become so tightly wedged or jammed in the blade as to prevent forward loosening rotation of the ring in the blade for removal of the ring.

In the particular examples illustrated, I provide means for preventing accidental or abnormal loosening rotation or movement of the ring within the blade. I can economically, conveniently, and efficiently accomplish this result by locating a locking plug, filler or rivet in one or more of the clearance openings 12, formed between the abrupt shoulders of the ring and blade when the ring is in locked position. This locking filler or rivet 13, can be formed by some soft readily applied and removed metal, such as tin or some suitable comparatively soft alloy. The cutter ring is provided with a series of uniformly-spaced cutter pockets or sockets opening at their inner ends through the inner edge of the ring. The number of pockets is preferably equal to the number of inclined surfaces 10, at the outer edge of the ring and usually each pocket is arranged opposite or is backed by an incline or abutment 20. Each pocket extends across the ring but not completely therethrough and the outer end of the pocket is closed so that the ring is comparatively narrow and preferably flexible or elastic at those portions intervening between the inclines 20 and the floors of the pockets. The pockets can be shaped or formed to detachably receive any suitable form or construction of inserted cutters. I preferably employ so-called high speed or high duty cutters, composed of steel or other alloy.

In the particular example illustrated, by Fig. 1, the ring is formed with slightly tapered grooved-edge pockets 22, to receive and be completely filled by inserted cutters 3, slightly tapered or wedge-shaped to wedge and lock in the pockets when driven longitudinally thereinto with the points 23, of the cutters projecting into the work-receiving opening. The edges of the cutters are shown V-shaped to form ribs to enter the grooved edges of the pockets and thereby lock the cutters against lateral displacement, although I do not wish to so limit my invention.

The formations of the ring and blade are such that when the cutters are in action there is a tendency to tighten up the ring or to slightly reduce the internal diameter of the ring and thereby tightly pinch, grip, or lock the cutters in the ring. This pinching action on the inserted cutters results from the slight flexibility of the ring at the narrow portions thereof beyond the floors of the pockets in connection with the wedging of the inclined abutments of the blade exerted on the portions of the ring that ride up on said abutments.

The employment of a comparatively flexible ring avoids expensive accuracy in the construction of the ring and cutters and permits the use of comparatively small pieces of expensive material to form or constitute the cutters, and avoids the use of expensively formed cutters and locking wedges therefor. The blade, ring and cutters can be inexpensively constructed. Furthermore, said blade, ring and cutters can be made comparatively thin or narrow to very economically work at moderate speeds in severing steel and other bars of moderate diameter with the formation of a kerf of minimum width. The blade, ring and cutters can be made, assembled and operated for certain kinds of work at a minimum expense.

A stock or considerable number of cutter rings fitted with inserted cutters can be kept on hand for each cutting off machine in use. The cutters of these rings in stock can be kept sharpened. Means will be preferably provided to sharpen all the cutters of a ring while fixed in the ring.

Whenever the cutters in use in the machine need replacing or become dull, it is a simple matter requiring but a very few minutes, to remove the ring with its dull cutters from the blade and insert in the blade a ring from stock having sharp cutters, and that without disturbing the blade or removing the same from its drum. The dull cutters of the rings removed can be resharpened and the ring replaced in stock. By this method, the running or operating time of the cutting off machine is increased to the maximum, inasmuch as cutters dull rapidly and require frequent sharpening or replacing in the operation of modern cutting-off machines, and cutter maintenance constitutes a heavy expense in the operation of such machines.

If so desired, the cutter ring might be formed with cutter pockets 6, to receive cutters 7, somewhat reduced with respect to the size of the pockets and adapted to be removably secured and locked in such pockets by casting soft metal 8, between the edges of the cutter and edge walls of the pocket, see Figs. 6 and 7. For instance, the edge walls of the pocket can be longitudinally grooved, see 60, and the edges of the cutter correspondingly grooved see 70, whereby the molten soft metal will flow into the grooves and on cooling will form keys in the ring and cutter edges locking the cutter against lateral deflection. When casting the locking soft metal in the pockets and around the cutters, the cutters will be held with their rear edges abutting and attaining a firm backing against the rear edge walls of the pockets.

Any suitable low melting point, or other soft metal can be used for the purpose, that will firmly lock the cutters in the ring and yet permit removal of the locking metal and release of a cutter when cutter replacement or renewal is necessary. This method of locking the cutters is comparatively inexpensive and permits use of comparatively inexpensive sizes of high duty cutters and does not require expensive accuracy in construction.

The cutter rings might have their inserted cutters 9, secured in the ring pockets 91, by wedges 90, each pocket having a wedge 90, longitudinally driven thereinto behind and backing the cutter in such pocket, see Fig. 5, although such construction would be expensive in comparison with and possibly not so advantageous as the structures hereinbefore described.

I do not wish to limit all features of my invention to any particular means for or manner of removably securing or locking the ring carrying inserted cutters in or to the blade, nor do I wish to limit the broad features of my invention to any particular construction or form of inserted cutters or locking means therefor.

I do not herein broadly claim a saw blade having a central-work-receiving opening with a removable cutter ring fitted in said opening, the ring and blade edge having series of coöperating abutting wedging or other locking surfaces, nor do I herein claim a soft metal or removable filler between a saw blade and a removable cutter ring to prevent loosening movement of the ring within the blade, as claims based on said structures are made in my co-pending application filed May 27, 1911, S. No. 629,818, for rotary metal cutting-off devices.

It is evident that various changes, variations and modifications might be resorted to in the forms, constructions and arrangements described without departing from the spirit and scope of my invention as set forth in the annexed claims and hence I do not wish to limit myself to the exact disclosure hereof.

What I claim is;—

1. A blade having a central work receiving opening, a removable cutter ring fitted to the blade edge about said opening and driven thereby and provided with cutter pockets opening through its inner edge, and inserted cutters fixed in said pockets and carried by said ring.

2. A blade having a central work receiving opening, a removable cutter ring in said opening and locked to and backed and driven by said blade and provided with and carrying inserted cutters fixed in said ring.

3. A blade having a central work receiving opening, the edge of the blade around said opening forming inclined wedging abutments, and a cutter ring provided with inserted cutters fixed therein and projecting inwardly therefrom, said cutter ring adapted to be removably fitted in said opening and having portions to ride on said abutments.

4. A blade having a central work receiving opening formed with edge abutments about said opening, and a cutter ring fitted in said opening and engaging said abutments and removably locked to the blade, said ring having inwardly opening cutter pockets and provided with cutters fixed in said pockets and carried by and removable with the blade.

5. A rotary carrier having a central work receiving opening and inclined or wedging edge portions around said opening, and a cutter ring arranged in said opening and having outer edge portions to ride on said inclined edge portions to removably lock and wedge the ring in the carrier, said ring formed with cutter pockets and provided with inserted cutters fixed in said pockets and carried by and removable from and applied to said carrier with said ring.

6. A rotary driving member having a central work receiving opening and abutments about said opening, and a cutter ring having inwardly opening cutter pockets and inserted cutters fixed therein, said ring adapted to be removably fitted and locked in said opening in engagement with said abutments, said ring being compressible in action to more firmly lock the cutters therein.

7. A rotary driving member having a central work receiving opening and formed with a series of inclines about said opening, and a compressible cutter ring having inserted cutters secured therein and projecting inwardly therefrom, said ring adapted to be secured and locked in said member about said opening and at its outer edge having portions to ride and be backed by said inclines.

8. A rotary driving member having a central work receiving opening, and a cutter ring fitted in said opening and removably locked to said member and provided with inserted cutters secured therein and projecting inwardly therefrom.

9. A rotary driving member having a work receiving opening, a cutter ring having cutter pockets extending partially therethrough and opening through the inner edge thereof, and inwardly-projecting inserted cutters secured in said pockets, means being provided whereby said ring is removably locked in said member and around said opening, and whereby said ring is compressed when in action to exert locking or clamping pressure on said cutters.

10. A flat approximately flexible cutter ring having cutter pockets opening through one edge thereof and extending partially through the ring toward the opposite edge thereof, inserted projecting cutters in said pockets, and locked to and carried by said ring, and a rotary driving member removably receiving said ring.

11. A rotary driving member having a central opening and a series of abutments about said opening, a cutter ring adapted to be removably locked in said member about said opening and at its outer edge having a series of abutments to engage and be backed by said abutments of said member, and inserted cutters secured in said ring and carried thereby.

In testimony whereof I affix my signature in presence of two witnesses.

GEORGE GORTON.

Witnesses:
E. S. GERE,
C. C. ERLANDSON.

Copies of this patent may be obtained for five cents each, by addressing the "Commissioner of Patents, Washington, D. C."